July 21, 1936.   J. L. WESTFALL   2,048,089
EASTER BASKET
Filed Nov. 7, 1935

Inventor
John L. Westfall,
By Clarence A. O'Brien
Attorney

Patented July 21, 1936

2,048,089

UNITED STATES PATENT OFFICE 2,048,089

EASTER BASKET

John L. Westfall, Cleveland, Ohio

Application November 7, 1935, Serial No. 48,753

2 Claims. (Cl. 217—125)

The present invention relates to new and useful improvements in Easter baskets and has for one of its important objects to provide, in a manner as hereinafter set forth, novel means for strengthening or bracing the handle of said basket.

Other objects of the invention are to provide a basket of the aforementioned character which will be comparatively simple in construction, strong, durable, light in weight, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figures 1, 2:
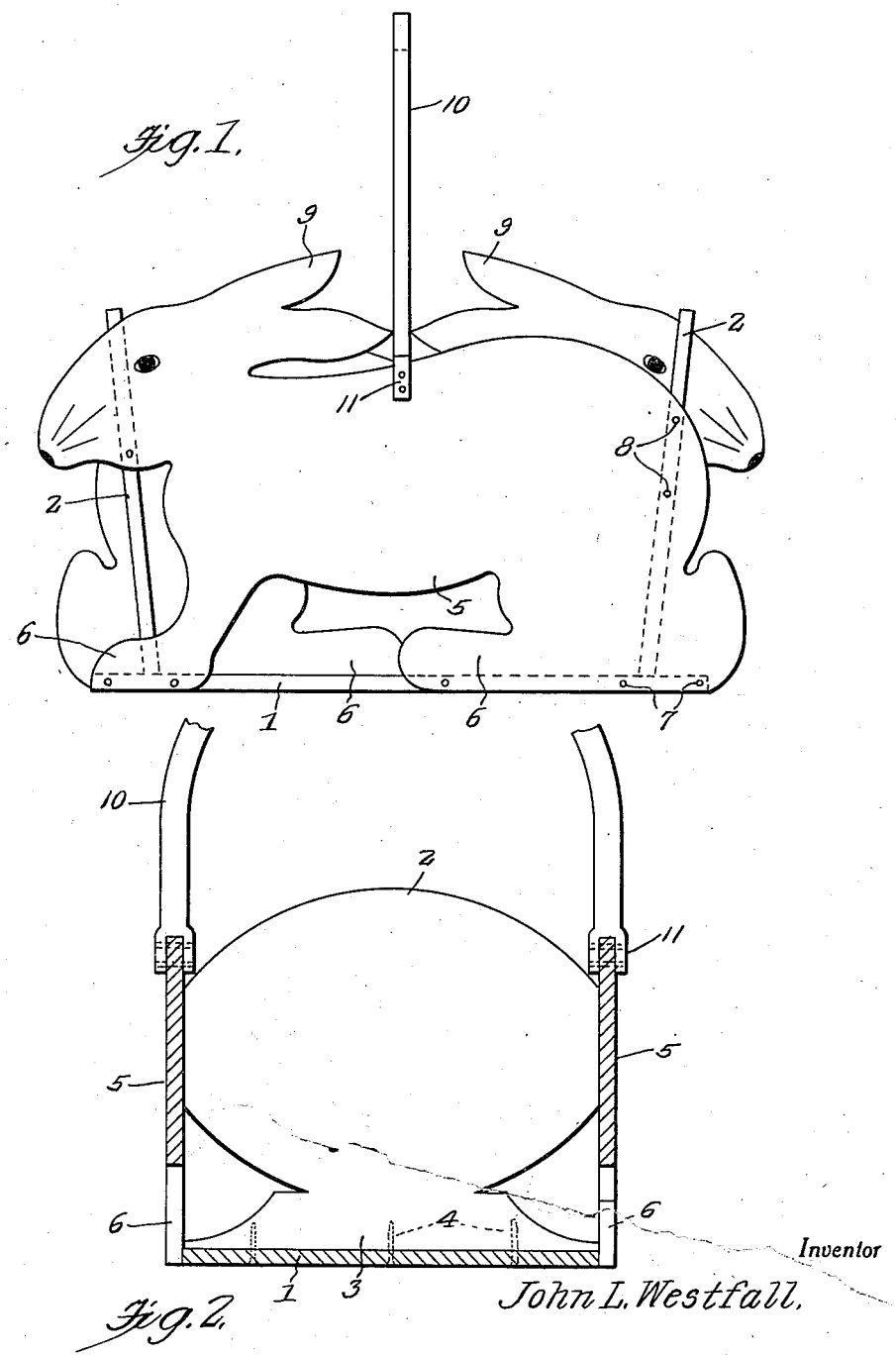
Figure 1 is a view in side elevation of an Easter basket constructed in accordance with the present invention.
Figure 2 is a view in vertical transverse section through the invention.

Referring now to the drawing in detail, it will be seen that the embodiment of the invention which has been illustrated comprises a substantially flat bottom 1 on which oppositely inclined end walls 2 are mounted. As best seen in Figure 2 of the drawing, the end walls 2 are substantially oval and include integral base portions 3 secured to the bottom 1, as at 4. It will be observed that the bottom 1 projects beyond the end walls 2.

Mounted on the longitudinal edges of the bottom 1 are side walls 5 having the form or outline of oppositely arranged animals, preferably rabbits. The feet 6 of the animals 5 are secured to the longitudinal edges of the bottom 1, as at 7. The animals or figures constituting the side walls 5 are also secured to the ends of the walls 2, as at 8. It will be noted that each of the oppositely disposed animals or figures 5 includes rearwardly projecting ears 9.

The reference numeral 10 designates a substantially U-shaped carrying handle which is rigidly secured to the figures constituting the side walls 5. At its ends, the handle 10 terminates in bifurcations 11 (see Figure 2) which straddle the upper portions of the figures 5 and which are secured thereto.

Referring now to Figure 1 of the drawing, it will be seen that one of the ears 9 of each of the figures 5 projects beyond the other of said ears. The construction and arrangement is such that the comparatively long ears abut opposite sides of the handle 10 adjacent the ends thereof in a manner to constitute supports or braces for said handle, thus materially strengthening or reinforcing the basket at what are usually comparatively weak points, namely, the connections of the ends of the handle to the body of said basket.

It is believed that the many advantages of a basket constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A basket comprising side walls in the form of oppositely arranged animal figures, and a substantially U-shaped handle secured, at its ends, to the figures, said figures comprising representations of ears engaged with opposite sides of the handle and constituting braces therefor.

2. An Easter basket comprising a substantially flat bottom, end walls secured to the bottom in spaced relation to the ends of said bottom, said end walls including base portions and substantially oval portions integral with said base portions, side walls secured to the longitudinal edges of the bottom and to the ends of the end walls, said side walls being in the form of oppositely disposed representations of animals, a substantially U-shaped handle secured to said side walls, and braces projecting from said side walls and including free ends in abutting engagement with opposite sides of the handle, said braces representing ears on the animals.

JOHN L. WESTFALL.